(12) United States Patent
Thompson

(10) Patent No.: US 6,742,259 B2
(45) Date of Patent: Jun. 1, 2004

(54) ASSEMBLING BEARING HOUSINGS FOR ROTARY SHAFTS

(75) Inventor: David Ian Thompson, Worthing (GB)

(73) Assignee: Ricardo Consulting Engineers Limited (GB)

( * ) Notice: Subject to any disclaimer, the term of this patent is extended or adjusted under 35 U.S.C. 154(b) by 208 days.

(21) Appl. No.: 10/028,883

(22) Filed: Dec. 20, 2001

(65) Prior Publication Data

US 2002/0073546 A1 Jun. 20, 2002

(30) Foreign Application Priority Data

Dec. 20, 2000 (GB) .............................................. 0031115

(51) Int. Cl.$^7$ ................................................ B23P 17/00
(52) U.S. Cl. ................................ 29/898.09; 29/898.04; 29/466; 29/513
(58) Field of Search ........................... 29/898, 898.04, 29/898.07, 898.09, 888.09, 445, 463, 464, 466, 505, 513, 557, 525.01, 525.02, 434, 521, 26 A, 26 R; 74/579 E; 384/129, 434, 429, 537, 559; 408/708, 707

(56) References Cited

U.S. PATENT DOCUMENTS

| | | | | |
|---|---|---|---|---|
| 1,151,339 A | * | 8/1915 | Browning | 384/268 |
| 2,553,935 A | * | 5/1951 | Parks et al. | 225/2 |
| 2,560,413 A | * | 7/1951 | Carlson | 384/434 |
| 2,870,533 A | * | 1/1959 | Benham | 29/525 |
| 2,975,928 A | * | 3/1961 | Roovers | 220/2.3 R |
| 3,482,467 A | * | 12/1969 | Volkel | 74/579 R |
| 3,790,236 A | * | 2/1974 | Pierce | 384/430 |
| 4,396,309 A | * | 8/1983 | McCormick | 403/14 |
| 4,688,446 A | * | 8/1987 | Ishikawa | 74/579 E |
| 5,524,507 A | * | 6/1996 | Olmr et al. | 74/579 E |
| 5,564,837 A | * | 10/1996 | Putnam et al. | 384/434 |
| 5,722,036 A | * | 2/1998 | Shikata et al. | 419/38 |
| 5,799,565 A | * | 9/1998 | Bo | 92/187 |
| 5,826,331 A | * | 10/1998 | Myers et al. | 29/888.09 |
| 6,017,151 A | | 1/2000 | Heinemann | |

FOREIGN PATENT DOCUMENTS

| | | |
|---|---|---|
| DE | 198 49 081 A1 | 11/1999 |
| GB | 2016094 * | 9/1979 |
| WO | WO 97/42424 | 11/1997 |

* cited by examiner

Primary Examiner—Charles T. Jordan
Assistant Examiner—T. Nguyen
(74) Attorney, Agent, or Firm—Osha & May L.L.P.

(57) ABSTRACT

A method of assembling a bearing house for a rotary shaft, such as a camshaft, comprising a bearing cap secured to a relatively massive component, such as a cylinder head. The bearing cap and the massive component afford respective semi-circular recesses which cooperate to define a circular hole in which the rotary shaft may be received. The method comprises connecting the bearing cap to the massive component, deforming at least spaced portions of the bearing cap into intimate contact with the massive component so as to produce a unique relocation position, boring the circular hole in the bearing cap and the massive component, removing the bearing cap, inserting the shaft into the semi-circular recess afforded by the massive component and reconnecting the bearing cap to the massive component.

6 Claims, 2 Drawing Sheets

ASSEMBLING BEARING HOUSINGS FOR ROTARY SHAFTS

FIELD OF THE INVENTION

The present invention relates to a method of assembling a bearing housing for rotary shafts of the type comprising a bearing cap secured to a relatively massive component, the bearing cap and the massive component affording respective semi-circular recesses which cooperate to define a circular hole in which a rotary shaft is received. An example of such a bearing housing is for an engine camshaft and in this case the massive component to which the bearing cap is connected, typically by two bolts, is a cylinder head. The rotary shaft engages the surface of the circular hole either directly or indirectly via a thin strip of e.g. softer metal with which the hole is lined, in each case with the interposition of a thin oil film.

It is of course essential for the smooth rotation of the shaft that the hole is precisely circular. It is in practice not possible for the bearing cap and the massive component to be manufactured with precisely semi-circular recesses and for the bearing housing then simply to be assembled around the shaft because the relative positions of the bolt holes and the semi-circular recesses can not be sufficiently accurately predetermined. If this technique is adopted the hole in practice always has a degree of non-circularity.

DESCRIPTION OF THE PRIOR ART

Accordingly, the bearing cap and the massive component are in practice manufactured with substantially semi-circular recesses and are then connected together, e.g. by bolts. The hole is then bored out in situ to ensure that it is truly circular. The bolts and the bearing cap are then removed and the shaft placed in position and the bearing cap then replaced. It is, however, essential that the bearing cap is aligned in precisely the same position as previously to ensure the necessary circularity of the hole.

Various alignment techniques are known for ensuring the precisely correct relocation of the bearing cap on the massive component and these include the use of dowels, locating bolts and lock notches and the use of very accurately machined and tight fitting bolts which do not permit any positional inaccuracy. The latter technique is the easiest and least costly but there is the risk that when the bolts are tightened the bearing cap will tilt and thus create an edge load on the shaft. This can result in higher bearing friction. The use of dowels, notches or the like can eliminate the problem of tilting but the dowel location holes on the bearing cap and the massive component must be machined separately and the pitch errors which can occur lead to difficulties in removing the bearing caps prior to installation of the shaft.

It is the object of the present invention to provide a method of assembling a bearing housing of the type referred to above which is both cheap and simple and does not suffer from the various disadvantages discussed above.

SUMMARY OF THE INVENTION

According to the present invention, a method of assembling a bearing housing for a rotary shaft of the type referred to above comprises connecting the bearing cap to the massive component, deforming at least two spaced portions of one of the bearing cap and the massive component into intimate contact with the other of the bearing cap and the massive component, boring the circular hole in the bearing cap and the massive component, removing the bearing cap, inserting the shaft into the semi-circular recess afforded by the massive component and reconnecting the bearing cap to the massive component.

In the method in accordance with the invention, spaced portions of the bearing cap are deformed into intimate contact with the massive or large component prior to boring the circular hole for accommodating the rotary shaft. This deformation defines a unique relocation position for the bearing cap with respect to the large component which means that when the bearing cap is again relocated on the large component it automatically adopts this unique position, that is to say the position in which the two precisely semi-circular recesses afforded by the bearing cap and the large component are precisely aligned with one another to define a truly circular hole in which the rotary shaft is accommodated. The bearing cap may thus be precisely repositioned without the use of dowels, locating bolts and the like, as referred to above. The intimately contacting surface regions of the bearing cap and the large component provide an increased surface area for receiving the clamping forces of the bolts and also resist the tendency of the bearing cap to twist when the bolts are tightened. As a result of the fact that the positional accuracy of the location of the bearing cap with respect to the large component is ensured by the intimately contacting surface regions, there is no particular need for precise positional accuracy of the bolt holes or close machining tolerances of the mating screw threads which means that the bolt holes in the bearing cap may simply be cast in rather than having to be drilled and the screw thread pitch tolerance may be relaxed, both of which result in a financial economy in the manufacturing process.

Whilst it is possible for the circular hole to be bored out in its entirety after the bearing cap has initially been connected to the large component, it is preferred that both the bearing cap and the large component afford substantially semicircular recesses before the bearing cap is initially connected to the large component for the first time. These two semi-circular recesses will inevitably not line up precisely to form a truly circular hole and they are in any event preferably initially made somewhat undersized. However, this means that only a relatively small amount of material need be removed when the final boring or machining of the circular hole is performed.

Whilst the bearing cap may have a relatively large number of spaced portions which are deformed into intimate contact with the large component, it is preferred that there are only two such portions in the form of projecting lugs. These lugs are preferably diametrically offset with respect to the circular hole to be formed.

Each of the projecting lugs may be deformed or bent about a single axis and it is found in practice that this adequately restrains relative movement of the bearing cap and the large component in all directions other than the direction in which the two components are moved away from one another and thus adequately defines a precise relocation position in which the bearing cap is replaced when reconnecting it to the large component. It is, however, preferred that the deformation of the projecting lugs is more complex and that the surface portions of the bearing cap and the large component in intimate contact with one another positively restrain relative movement of the bearing cap and large component in all directions other than the direction in which these two components are moved apart from one another.

In one embodiment of the invention, the surface of the large component which is engaged by the bearing cap is afforded by an upstanding formation, in which a semi-circular recess is formed, the outer side surfaces directed away from each other of which formation have a respective recess formed in them into which a respective lug on the bearing cap is deformed.

In an alternative embodiment, the surface of the large component which is engaged by the bearing cap has one or more spaced holes formed in it on each side of the semi-circular recess into which the portions of the lugs on the bearing cap are deformed.

Further features and details of the invention will be apparent from the following description of certain specific embodiments which is given by way of example with reference to the accompanying diagrammatic drawings.

DESCRIPTION OF THE PREFERRED EMBODIMENTS

All the embodiments referred to above relate to a camshaft bearing housing and the relatively large component is therefore a cylinder head.

Figure 1:
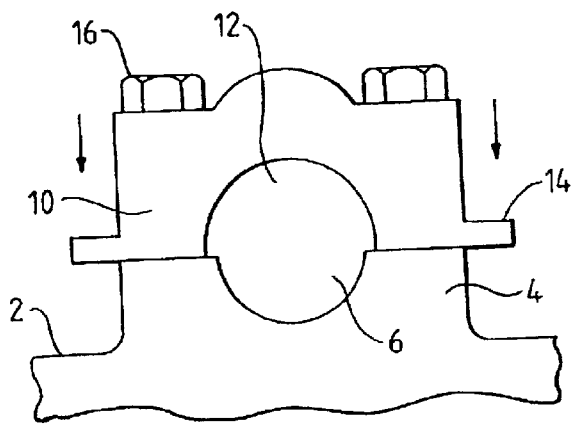
FIGS. 1 and 2 are views of successive stages of assembly of a bearing housing in accordance with the invention.
Figure 2:
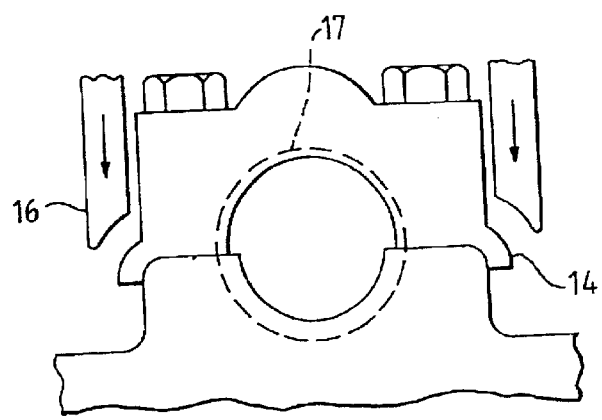

Referring firstly to FIGS. 1 and 2, a relatively large component, in this case a cylinder head 2, is produced, e.g., cast, with a number of spaced upstanding rectangular formations 4. Formed in the upper surface of each formation 4 is substantially semi-circular recess 6. Threaded bolt holes 8 (seen in FIG. 3) are then formed, or cast ab initio, in the upper surface of the formation 4 on each side of the recess 6. The upper surface of the formation is ground or otherwise machined to be flat.

A generally rectangular section bearing cap 10 is also produced, e.g., cast with a substantially semi-circular recess 12, corresponding to the recess 6, formed in its underside. Bolt holes corresponding to the holes 8 are formed, or cast ab initio, in the bearing cap extending between its upper and lower surfaces. Integral with each end of the bearing cap and contiguous with its lower surface is a longitudinally extending lug 14. The lower surface of the bearing cap is ground or otherwise machined to be flat.

Figure 3:
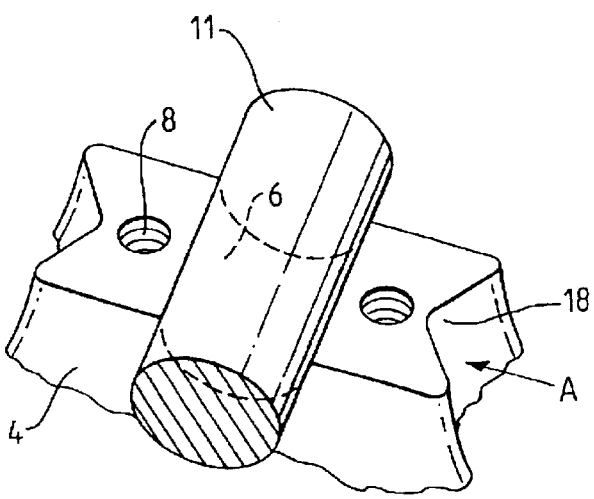
FIGS. 3 and 4 are views relating to a modified construction of bearing housing.

To assemble the bearing housing, the bearing cap is placed on the formation 4 with the opposed flat surfaces in smooth engagement. Bolts 16 are then inserted into the mating holes and screwed tight into the threaded holes in the formation 4 thereby firmly connecting the two components together. The two lugs 14 are then deformed downwardly by a pair of connected plungers 16, as shown in FIG. 2. The lugs 14 are bent through an angle of up to but not greater than 90° into intimate contact with the opposed end surfaces of the upstanding formation 4. A unique relative location of the bearing cap 10 and the cylinder head 2 is thus created. As shown in FIGS. 1 and 2, the two semicircular recesses do not precisely match up and they are in any event in practice somewhat undersized. The generally circular hole constituted by the two semi-circular recesses is then bored out to a precisely circular shape involving the removal of material back to the line 17 seen in FIG. 2. The bolts are then removed from the holes and the bearing cap removed from the cylinder head, whereafter a rotary shaft, in this case a camshaft 11, which is shown indicatively in FIG. 3, is inserted into the lower half of the circular hole. The bearing cap is then placed over it and relocated in the unique location position defined by the previous deformation of the lugs 14. The bolts 16 are then reinserted into the holes and tightened.

By virtue of the precise relative location position of the bearing cap with respect to the cylinder head established by the deformation of the lugs 14, the hole accommodating the shaft is necessarily truly circular and there is no increased frictional loading on the shaft conventionally associated with twisting of the bearing cap which can be caused during retightening of the bolts.

Figure 4:
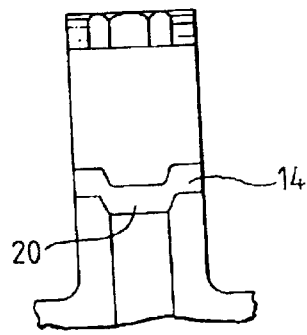

In the embodiment of FIGS. 1 and 2, the lugs 14 are bent downwardly about respective axes extending parallel to the axis of the circular hole. The intimately engaging surfaces of the bearing cap and the formation 4 extend in the axial direction and whilst they therefore positively restrain any relative movement of the bearing cap and the cylinder head in the horizontal direction perpendicular to the axis of the hole, the restraint of relative movement in the axial direction is not necessarily wholly reliable. This potential problem is overcome in the embodiment shown in FIGS. 3 and 4 in which the two opposed end surfaces of the formation 4 are provided with respective generally V-shaped recesses 18. The central portion of the lugs 14 are deformed downwardly into the recesses 18 and are forced into intimate engagement with the two inclined surfaces of the recesses 18. It will be appreciated that the intimately engaging surfaces reliably prevent relative movement of a bearing cap and the cylinder head in all directions other than the vertical direction, as seen in FIG. 4, that is to say in the direction in which the bearing cap is moved away from the cylinder head. A more precise and positive relative location position of the bearing cap and the cylinder head is thus created.

Figure 6:
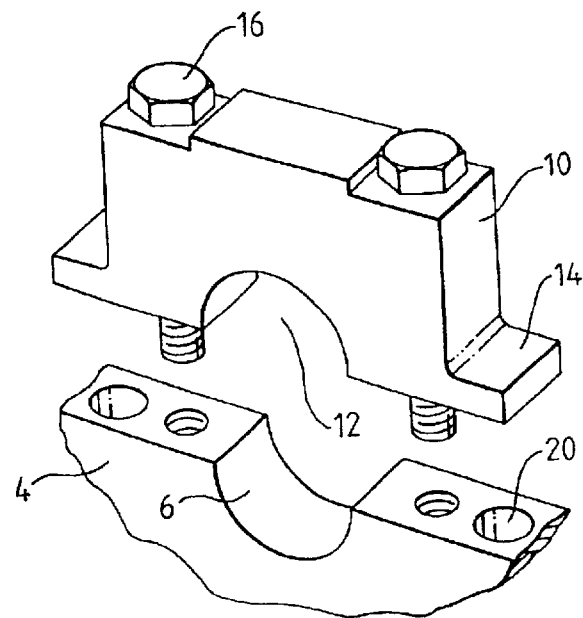
FIGS. 6 and 7 are views of yet a further embodiment of bearing housing assembled in accordance with the invention.
Figure 7:
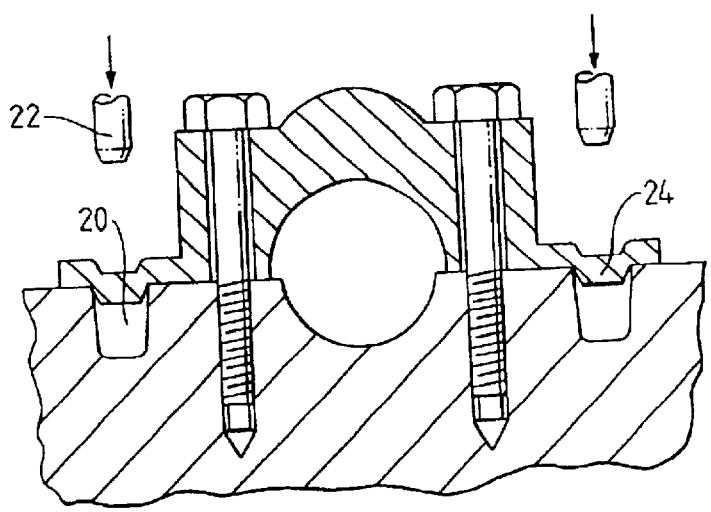

A similar advantageous effect is achieved by the embodiment illustrated in FIGS. 6 and 7 in which one or more holes or recesses 20 are formed in the upper surface of the formation 4 on each side of the semi-circular recess 6. When the bearing cap 10 is placed in position for the first time, the lugs 14 overlie the holes 20. After tightening of the bolts 16, the portions of the lugs overlying the holes 20 are deformed down into the holes by two connected plungers 22, as shown in FIG. 7. The circular section deformed portions 24 of the lugs 14 engage the internal surface of the holes 20, thereby establishing a unique relative location position of the bearing cap 14 and the cylinder head, relative movement in all directions other than the vertical direction, as seen in FIG. 7, being restrained.

The embodiment of FIGS. 6 and 7 could be further enhanced by including one or more indentation pins on the fixture to which the plungers 22 are connected. These indentations pins are arranged so as to contact and indent the upper surface of the bearing cap, whereby the size and./or depth of the indentation(s) formed gives a reliable indication of the extent to which the portions of the lugs 14 overlying the holes 20 have been deformed.

Figure 5:
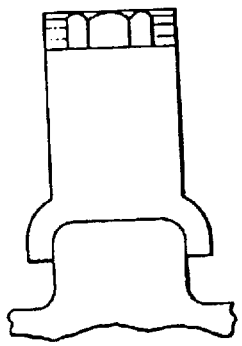
FIG. 5 is a view of a further modified bearing housing.

In all of the embodiments described above there are two spaced portions on the bearing cap which are deformed, namely oppositely directed lugs which extend, prior to deformation, in the direction perpendicular to the axis of the circular hole. It will, however, be appreciated that it is also possible for the bearing cap to be provided with two lugs on each side of the hole which are oppositely directed and extend in the axial direction. Each lug of the two opposed pair of lugs is then bent or deformed about a respective axis extending perpendicular to the axis of the circular hole, as shown in FIG. 5.

In all the embodiments described above the lugs or projecting portions are connected to the bearing cap and are deformed into contact with the large component. It will, however, be appreciated that the reverse arrangement is also possible and that the lugs may be connected to the larger component and deformed into contact with the bearing cap.

What is claimed is:

1. A method of assembling a bearing housing for a rotary shaft comprising a bearing cap and a relatively massive component, said bearing cap and said massive component defining respective semi-circular recesses, which cooperate to define a circular hole in which said rotary shaft may be received, the method comprising:

connecting said bearing cap to said massive component, deforming at least two spaced portions of one of said bearing cap and said massive component, deforming at least two spaced portions of one of said bearing cap and said massive component into intimate contact with the other of said bearing cap and said massive component, so as to define a unique relocation position for said bearing cap with respect to said massive component, wherein said at least two spaced portions comprise two projecting lugs on opposite sides of said circular hole, boring said circular hole in said bearing cap and said massive component, removing said bearing cap, inserting said shaft into said semi-circular recess of said massive component, and reconnecting said bearing cap to said massive component.

2. The method as claimed in claim 1, wherein said bearing cap and said massive component comprise substantially semi-circular recesses before said bearing cap is connected to said massive component for the first time.

3. The method as claimed in claim 1, wherein said bearing cap comprises said two projecting lugs, which are diametrically offset with respect to said circular hole to be formed.

4. The method as claimed in claim 1, wherein said circular hole has an axis and said massive component has an engagement surface, which is engaged by said bearing cap, and wherein said massive component is so shaped that, when said spaced portions of said bearing cap are deformed into contact with said massive component, relative movement of said bearing cap and said massive component is positively prevented in an axial direction of said axis of said circular hole, a first direction, which is perpendicular to said axis, and a second direction, which is perpendicular to said axis and the first direction and substantially parallel to said engagement surface of said massive component, which is engaged by said bearing cap.

5. The method as claimed in claim 4, wherein said massive component has an upstanding formation comprising said engagement surface which is engaged by said bearing cap, wherein said upstanding formation having two outer side surfaces directed away from each other, wherein said outer side surfaces having a respective recess formed therein, which said spaced portions are deformed, respectively.

6. The method as claimed in claim 4, wherein said engagement surface of said massive component, which is engaged by said bearing cap, has spaced holes formed therein on each side of said semi-circular recess and said spaced portions of said bearing cap are deformed into said spaced holes.

* * * * *